(12) United States Patent
Kobayashi et al.

(10) Patent No.: US 6,538,058 B2
(45) Date of Patent: Mar. 25, 2003

(54) POLYTETRAFLUOROETHYLENE COMPOSITION, METHOD FOR ITS PRODUCTION AND GRANULATED PRODUCT

(75) Inventors: Shigeki Kobayashi, Ichihara (JP); Shinya Higuchi, Ichihara (JP); Hideo Katsu, Ichihara (JP); Mitsuharu Morozumi, Kawasaki (JP); Satoru Kuroki, Kawasaki (JP)

(73) Assignees: Asahi Glass Company, Limited, Tokyo (JP); Asahi Glass Fluoropolymers Co., Ltd., Ichihara (JP)

( * ) Notice: Subject to any disclaimer, the term of this patent is extended or adjusted under 35 U.S.C. 154(b) by 0 days.

(21) Appl. No.: 09/960,334

(22) Filed: Sep. 24, 2001

(65) Prior Publication Data

US 2002/0061956 A1 May 23, 2002

(30) Foreign Application Priority Data

Sep. 25, 2000  (JP) ....................... 2000-290978

(51) Int. Cl.[7] ................................. C08L 3/04

(52) U.S. Cl. ....................... 524/495; 524/495; 524/546; 524/322; 428/325

(58) Field of Search ................. 524/546, 495, 524/322; 428/325

(56) References Cited

U.S. PATENT DOCUMENTS

| 4,263,184 | A | * | 4/1981 | Leo et al. ..................... 524/35 |
| 4,370,436 | A | * | 1/1983 | Nakamura et al. ........... 264/117 |
| 5,763,229 | A | * | 6/1998 | Kobayashi et al. ....... 430/108.6 |

* cited by examiner

Primary Examiner—David W. Wu
Assistant Examiner—Henry S. Hu
(74) Attorney, Agent, or Firm—Oblon, Spivak, McClelland, Maier & Neustadt, P.C.

(57) ABSTRACT

A PTFE composition comprising a dispersion-polymerized polytetrafluoroethylene (PTFE) and a filler, wherein the powder irregular shape ratio of the PTFE is at most 50%, and a PTFE granulated product obtained by granulating the PTFE composition. The composition is produced by jetting high pressure water to a mixture comprising the dispersion-polymerized PTFE and the filler. The dispersion-polymerized PTFE composition and granulated product thus obtained are suitable for molding.

14 Claims, 4 Drawing Sheets

POLYTETRAFLUOROETHYLENE COMPOSITION, METHOD FOR ITS PRODUCTION AND GRANULATED PRODUCT

BACKGROUND OF THE INVENTION

1. Field of the Invention

The present invention relates to a polytetrafluoroethylene (hereinafter referred to as PTFE) composition, a method for its production and a granulated product.

2. Discussion of Background

A composition having a filler blended to PTFE (hereinafter referred to as a PTFE composition) is widely used as a raw material for a molded product having improved creep resistance, abrasion resistance, etc. in addition to excellent properties of PTFE, such as heat resistance, chemical resistance and sliding properties.

A PTFE composition to be used for molding, is prepared by adding various fillers to fine powdery PTFE produced by a suspension polymerization method (hereinafter referred to as suspension-polymerized PTFE), followed by uniform mixing. Further, this PTFE composition may be granulated as the case requires to obtain a PTFE granulated product having a large particle diameter and good handling efficiency.

On the other hand, PTFE produced by a dispersion polymerization method (hereinafter referred to as a dispersion-polymerized PTFE) is mixed with an organic solvent such as naphtha to obtain a paste, which is then subjected to preforming. The obtained preform is subjected to extrusion molding (hereinafter referred to as a paste extrusion molding method). By the paste extrusion molding method, tubes or various film products are produced.

Heretofore, such dispersion-polymerized PTFE could not be subjected to commercially important molding such as compression molding or ram extrusion molding where suspension-polymerized PTFE was used.

The reason is considered to be as follows. Fine powdery PTFE produced by a dispersion polymerization method (hereinafter referred to as PTFE fine powder) has such a nature that upon receiving a shear force at the time of mixing with the filler, it tends to be fibrillated (hereinafter referred to as fibrillation). Accordingly, the dispersion-polymerized PTFE composition was likely to be lumpy, whereby handling efficiency for molding was poor. Further, a granulated product obtained from such a composition had a problem that not only the apparent density was low and the productivity in molding was low, but also cracks were likely to form in the molded product.

As a method for producing a uniform composition from a dispersion-polymerized PTFE and a filler, a method has been proposed in which an aqueous dispersion of the dispersion-polymerized PTFE is stirred with various fillers and coagulated (see e.g. JP-B-52-34653, JP-B-56-48528, JP-B-63-46097, and JP-A-8-253600). However, the obtained fine powdery PTFE composition and its granulated product had problems such that as PTFE was susceptible to fibrillation as mentioned above, they tend to be lumpy, their apparent densities were low, their yields as products were low, and cracks were likely to form in their molded products.

SUMMARY OF THE INVENTION

It is an object of the present invention to provide a dispersion-polymerized PTFE composition which can be subjected to molding, a method for its production and a granulated product thereof.

The present invention provides a PTFE composition comprising a dispersion-polymerized PTFE and a filler, wherein the powder irregular shape ratio of the PTFE is at most 50%.

Further, the present invention provides a method for producing the above PTFE composition, which comprises jetting high pressure water to a mixture comprising a dispersion-polymerized PTFE and a filler to obtain a PTFE composition having the PTFE and the filler dispersed.

Still further, the present invention provides a PTFE granulated product, obtained by granulating the above PTFE composition.

DETAILED DESCRIPTION OF THE PREFERRED EMBODIMENTS

Figure 1:
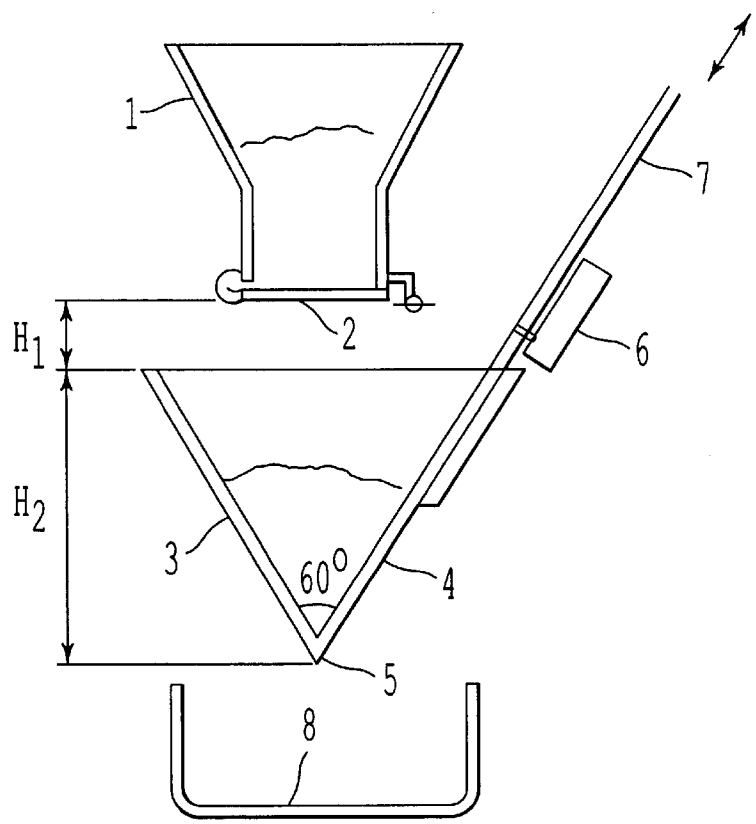
FIG. 1 is a view illustrating an apparatus for measuring the powder flowability.

In the present invention, a dispersion-polymerized PTFE is used as PTFE.

In the production of the dispersion-polymerized PTFE, an aqueous medium, an emulsifying agent, a stabilization assistant and a polymerization initiator may, for example, be used for the polymerization of tetrafluoroethylene (hereinafter referred to as TFE). Further, the polymerization conditions are preferably such that the temperature is from 10 to 95° C., and the pressure is from 0.5 to 4.0 MPa.

As the emulsifier, a fluorine-containing organic acid such as perfluorooctanoic acid, perfluorononanoic acid, perfluoro-2,5-dimethyl-3,6-dioxanonanoic acid or perfluorooctanesulfonic acid, an ammonium salt or an alkali metal salt (such as lithium salt, sodium salt or potassium salt) thereof is preferred. These emulsifiers may be used alone or in combination of two or more of them.

As the stabilization assistant, paraffin wax, fluorine-type oil, a fluorine-type solvent or silicone oil may, for example, be preferred. These stabilization assistants may be used alone or in combination as a mixture of two or more of them.

As the polymerization initiator, a water-soluble radical initiator or a water-soluble oxidation reduction type catalyst is, for example, preferred. As the water-soluble radical initiator, a persulfate such as ammonium persulfate or potassium persulfate, or a water-soluble organic peroxide such as bissuccinic peroxide, bisglutaric peroxide or tert-butyl hydroperoxide, is preferred. These initiators may be used alone or in combination as a mixture of two or more of them.

As PTFE, a homopolymer of TFE or a copolymer of TFE with a small amount of a comonomer, is preferably employed.

As the comonomer, various monomers copolymerizable with TFE may be employed. For example, a fluoroethylene such as $CF_2=CFCl$, $CF_2=CHF$ or $CF_2=CH_2$, a fluoropropylene such as $CF_2=CFCF_3$ or $CF_2=CHCF_3$, a perfluoroalkylethylene having from 4 to 12 carbon atoms in the perfluoroalkyl group, such as $CF_3CF_2CF_2CF_2CH=CH_2$ or $CF_3CF_2CF_2CF_2CF=CH_2$, a perfluorovinyl ether of the formula $R^f(OCFXCF_2)_mOCF=CF_2$ (wherein $R^f$ is a $C_{1-8}$ perfluoroalkyl group, X is a fluorine atom or a trifluoromethyl group, and m is 0 or an integer of from 1 to 5), or an olefin such as ethylene, propylene or isobutylene, may be mentioned. Such comonomers may be used alone or in combination as a mixture of two or more of them.

When polymerized units of a comonomer are contained in PTFE, the content of the polymerized units of the comonomer is preferably from 0.005 to 0.6 mol%, more preferably from 0.015 to 0.3 mol%. If the content of polymerized units of the comonomer is too large, a heat melting property will be imparted to PTFE, such being undesirable.

As the dispersion-polymerized PTFE in the present invention, various types may be employed without any particular restriction. Specifically, an aqueous dispersion of PTFE, a fine powder of PTFE, a granulated product of PTFE fine powder or a particulate product obtained by pulverization of an aggregated product, may, for example, be mentioned. Further, PTFE may be in a dried state or in a water-containing state.

The average particle diameter of the dispersion-polymerized PTFE is preferably from 0.05 to 300 μm. If the average particle diameter is too small, such a product tends to be hardly produced, and if it is too large, such will not be a granulated product which presents good physical properties as a molded product. The average particle diameter is more preferably from 0.1 to 200 μm.

As the filler in the present invention, various fillers may be employed. For example, glass fiber, carbon fiber, potassium titanate fiber, glass beads having a particle diameter of at most 50 μm, silica powder, alumina powder, carbon powder, bronze powder, talc powder, calcium carbonate powder, calcium fluoride powder, silicon carbide powder, boron nitride powder, silicon nitride powder, spherical carbon powder, molybdenum disulfide powder, graphite powder, coke powder, zinc oxide powder, tin oxide powder, polyamideimide resin powder, polyimide resin powder, polyethersulfone resin powder, polyphenylenesulfide resin powder, polyether ether ketone resin powder, or crosslinked PTFE powder, may be mentioned. The filler may have the surface treated with various treating agents. Further, such fillers may be used alone or in combination as a mixture of two or more of them.

The mixing ratio of the PTFE and the filler is suitably selected depending upon the filler. The mass ratio of the PTFE/the filler is preferably from 95/5 to 30/70. If the ratio of PTFE is too small, dispersion of the filler tends to be poor, and if it is too large, the modifying effect by the filler tends to be small. The mass ratio of the PTFE/the filler is more preferably from 90/10 to 40/60.

In the PTFE composition of the present invention, the powder irregular shape ratio of the PTFE is at most 50%. The powder irregular shape ratio is measured by the method which will be described hereinafter and is a proportion, as represented by area %, of particles having a ratio of the long axis to the short axis (hereinafter referred to as an aspect ratio) of at least 2 among PTFE particles having sizes of at least 10 μm and not bonded to the filler. It takes a large value when the content of deformed or fibrillated PTFE increases. The powder irregular shape ratio is preferably at most 40%, more preferably at most 35%.

In the PTFE composition of the present invention, the PTFE coverage is preferably from 30 to 100%. The PTFE coverage is measured by the method which will be described hereinafter and represents the proportion of the area covered with the PTFE to the total surface area of the filler. It indicates that as it takes a large value, the proportion of the filler and the PTFE bonded to each other, is large, and the dispersed state of the filler and the PTFE is good. The PTFE coverage is more preferably from 35 to 100%.

The average particle diameter of the PTFE composition is preferably from 5 to 300 μm. If the average particle diameter is too small, such a product tends to hardly be produced, and if it is too large, the product will not be a granulated powder having good moldability. The average particle diameter is more preferably from 5 to 200 μm.

It is preferred that the PTFE and the filler are mixed in such a state as dispersed in a suitable medium. As such a medium, water, a hydrocarbon type solvent, a perfluorocarbon type solvent, a hydrofluorocarbon type solvent, a chlorofluorocarbon type solvent, or a gas such as nitrogen, may, for example, be mentioned.

As a preferred medium, water, a perfluorocarbon type solvent or a hydrofluorocarbon type solvent may be mentioned. Particularly preferred is water, since it is easy to handle.

When water is used as a medium, it is preferred to employ the dispersion-polymerized PTFE dispersed in water, and it is most preferred to use an aqueous dispersion of the dispersion-polymerized PTFE.

When an aqueous dispersion of the dispersion-polymerized PTFE is employed, the PTFE concentration in the aqueous dispersion of the dispersion-polymerized PTFE is preferably from 1 to 40 mass %. If the PTFE concentration is too low, it tends to be difficult to let the PTFE coagulate, and if it is too high, the PTFE not coagulated will remain, and the coagulation liquid will have turbidity. The PTFE concentration is preferably from 5 to 35 mass %, more preferably from 10 to 30 mass %.

As a method for producing the PTFE composition of the present invention, a method is preferred wherein the dispersion-polymerized PTFE and the filler are mixed while jetting high pressure water thereto. It is preferred to employ a method of jetting high pressure water to the gas-liquid interface of an aqueous dispersion of the dispersion-polymerized PTFE having the filler added, or a method of dispersing a PTFE fine powder and the filler in a medium and then jetting high pressure water thereto. When the dispersion-polymerized PTFE and the filler are mixed while jetting high pressure water thereto, it is possible to obtain a PTFE composition having a small powder irregular shape ratio and a large PTFE coverage, as compared with a case where they are mechanically mixed by means of e.g. a Henschel mixer.

The high pressure water can be formed by various apparatus. However, it is preferably generated by a machine which is commonly used for e.g. cleaning a plant, since no special installation is thereby required. The pressure of the high pressure water is preferably from 3.0 to 32 MPa, more preferably from 5.0 to 20 MPa. The pressure can be adjusted by suitably selecting e.g. the diameter of the nozzle for jetting.

The lower the mixing temperature, the smaller the particle diameter of the composition, such being preferred. However, if the temperature is too low, a cooling installation, etc., will be required to maintain the low temperature. The mixing temperature is preferably from 10 to 40° C.

When an aqueous dispersion of the dispersion-polymerized PTFE is used, a plurality of nozzles may be employed so that high pressure water is jetted from various directions, whereby coagulation of the PTFE and mixing with the filler can be completed in a short period of time, and a PTFE composition having a good dispersed state of the filler and the PTFE, can be obtained. The time required for the coagulation is short as compared with the coagulation by usual stirring, and when high pressure water is jetted, the coagulation may take place instantaneously. Further, with a view to shortening the mixing time or from the viewpoint of administration of the process time, a coagulation agent which is commonly used for coagulation of an aqueous dispersion of PTFE, may be added. As such a coagulation agent, ammonium carbonate or a polyvalent inorganic salt, a mineral acid, a cationic surfactant or an alcohol, may, for example, be mentioned.

The mechanism for development of the excellent properties of the PTFE composition of the present invention is not clearly understood. However, from the observation of the electron microscopic photograph shown in FIG. 4, it has been confirmed that primary particles of the dispersion-polymerized PTFE are bonded to the surface of the filler while maintaining the spherical shape. Further, as shown by the electron microscopic photograph of FIG. 3, the powder irregular shape ratio is small, and it is considered that the PTFE are not fibrillated, the proportion of the PTFE covering the filler increases, and a composition having the PTFE and the filler mutually finely dispersed, can be obtained, whereby the excellent properties are developed. Such properties are considered to have been developed by the instantaneous large physical energy exerted to the PTFE and the filler by the high pressure water.

The PTFE composition of the present invention is preferably granulated to improve the handling efficiency for e.g. molding.

For such granulation, various dry methods may be used. For a dry method, a granulation machine of tumbling type, agitation type or fluidized bed type may be mentioned. As the wet method, a method of stirring in water for granulation may, for example, be mentioned. Heating may be applied, or a solvent may be added, as the case requires. The average particle diameter of the granulated product is preferably from 100 to 1,000 $\mu$m, since the handling efficiency is thereby good. The average particle diameter of the granulated product is more preferably from 200 to 900 $\mu$m, particularly preferably from 300 to 800 $\mu$m.

The powder flowability of the granulated product of the present invention is a value measured by the method which will be described hereinafter and is preferably at most 15 mm. The lower the numerical value of the powder flowability, the better the handling efficiency of the powder. The powder flowability is more preferably at most 13 mm, most preferably at most 10 mm.

The PTFE composition and the PTFE granulated product of the present invention can be molded by various molding methods. Especially, the PTFE granulated product can be subjected to molding, to which a conventional dispersion-polymerized PTFE could not be subjected.

Molded products obtained by molding the PTFE composition and the PTFE granulated product of the present invention, have excellent properties in e.g. creep resistance, surface smoothness, high elongation and low electrostatic properties.

The molded products made of the PTFE composition and the PTFE granulated product of the present invention may be applied to various applications, such as non-lubricant bearings, sliding materials, rollers or belts.

Now, the present invention will be described in further detail with reference to Examples and Comparative Examples. However, it should be understood that the present invention is by no means restricted to such specific Examples. Examples 1 to 3 are Examples of the present invention, and Examples 4 and 5 are Comparative Examples. The methods for measuring the properties of the PTFE compositions and granulated products were as follows.

(A) Average particle diameter of a composition (unit: $\mu$m): Measured by means of a particle diameter distribution analyzer by laser scattering method (LA-920, manufactured HORIBA, Ltd.) by using isopropyl alcohol as a developing solvent.

(B) Powder irregular shape ratio (unit: %): A PTFE composition was observed by a scanning electron microscope (JSM-5200, manufactured by Nippon Denshi K. K.) with 200 magnifications, and two optional regions of a rectangular shape of 350 $\mu$m×200 $\mu$m were selected. Among PTFE powder particles having sizes of 10 $\mu$m or more not bonded to the filler and contained in the regions, the proportion of particles having an aspect ratio of 2 or more was represented by area %, which is taken as the powder irregular shape ratio.

(C) PTFE coverage (unit: %): A working curve was prepared as follows. A predetermined amount of a graphite powder was applied to prepare a sample of a PTFE sheet having a thickness of 14 $\mu$m and having the surface coated with the graphite powder. Then, this sample was observed by a scanning electron microscope (S-4000, manufactured by Hitachi, Ltd.) with 1,000 magnifications, whereby the proportion (unit: area %) not to covered with graphite in the surface of this sample was calculated.

On the other hand, measurement of Energy Dispersive X-ray Analysis (EDAX) (Model DX-4, manufactured by Nippon Philips K. K.) of the sample of the PTFE sheet having the surface covered with graphite, was carried out, whereby the proportion (unit:mass %) of fluorine atoms based on the total amount of carbon atoms and fluorine atoms at the surface of the sample, was calculated. Here, the conditions for the measurement of EDAX was such that the accelerating voltage was 10 kV, and the irradiation time was 200 seconds.

Based on the result of the measurement, the relation between the area ratio not covered with graphite and the mass ratio of fluorine atoms, was determined, and a working curve was prepared. The results are shown in Table 1.

The PTFE coverage was calculated as follows. The proportion of fluorine atoms at the surface of graphite in a PTFE composition, was measured by EDAX. The obtained measured value was compared with the working curve of Table 1, whereby the proportion (unit: area %) of the graphite surface covered with PTFE was calculated. Here, 15 particles of the filler were optionally selected and measured, and the average of the results was taken as the PTFE coverage.

TABLE 1

| Proportion not covered with graphite (area %) | Proportion of fluorine atoms (mass %) |
|---|---|
| 100 | 95 |
| 79 | 89 |
| 55 | 84 |
| 27 | 72 |
| 9 | 56 |
| 5 | 50 |
| 3 | 46 |
| 0 | 0 |

(D) Average particle diameter of a granulated product (unit: μm): Measured in accordance with JIS K6891. Sequentially from the top, 20, 30, 40, 45 and 60 mesh standard sieves were put together, and the powder was placed on the 20 mesh sieve, followed by sieving, whereupon the mass of the powder remaining on each sieve was obtained. The 50% particle diameter calculated by a logarithmic probability paper based on this mass, was taken as the average particle diameter.

(E) Apparent density (unit: g/ml): Measured in accordance with JIS K6891. Into a stainless steel weighing bottle having an internal volume of 100 ml, a sample was dropped from a funnel set above, and the sample bulging from the weighing bottle was scraped off with a flat plate, whereupon the weight of the sample remaining in the bottle was measured, and a value obtained by dividing the measured weight by the internal volume was taken as the apparent density.

(F) Powder flowability (unit: mm): In a room adjusted to be 25±2° C., using an apparatus as shown in FIG. 1, 100 g of a sample passed through a sieve of 9 mesh (aperture: 2,000 μm) was put into a first hopper 1. A lower door 2 of the first hopper 1 was opened all at once to fill the sample into a second hopper 3 which was distanced by $H_1$ (40 mm) from an opening (58×22 mm) and which had an opening having a size of 104×63 mm. The height $H_2$ of the second hopper was 92 mm, and on the second hopper, a movable rectangular slit plate 4 having a width of 63 mm and inclined at an angle of 30° from the vertical, was mounted. When 50 g of a sample was dropped into a receiver 8 by opening the connecting rod 7 of the slit plate 4 at a rate of 12 mm/min, the degree of the opening shown by a scale 6 indicating the opening width of the slit 5, was taken as the powder flowability.

(G) Tensile strength (unit: MPa) and elongation (unit: %): Measured in accordance with JIS K6891. A test sample was prepared as follows. The granulated PTFE composition was preformed under a pressure of 58.88 MPa and baked at 370° C. for 4 hours, followed by cooling at a temperature lowering rate of 70° C./hr to obtain a sheet having a thickness of 2 mm, from which a test sample was punched by a dumbbell No. 3 die.

(H) Compressive creep (unit: %): Measured in accordance with ASTM D621. The test conditions were 24° C., 13.73 MPa and 24 hours. A value obtained by subtracting the deformation (unit: %) upon expiration of 10 seconds after loading from the total deformation (unit: %) upon expiration of 24 hours after loading, was taken as the compressive creep. The test sample was prepared by the following method. A granulated PTFE composition was preformed under a pressure of 58.88 MPa and baked at 370° C. for 4 hours, followed by cooling at a temperature lowering rate of 70° C./hr to obtain a molded product of a disc shape of 50 mm in diameter ×50 mm in length, from which a test sample of 12.7 mm in diameter ×12.7 mm in length was prepared.

EXAMPLE 1

(a) Preparation of PTFE composition

An aqueous dispersion of PTFE which was obtained by dispersion polymerization and which had a standard specific gravity of 2.149 and contained 0.16 mol % of polymerized units of perfluoro(propyl vinyl ether), was adjusted to a concentration of 15 mass %. 30 kg of this PTFE aqueous dispersion was charged into a stainless steel container having an internal volume of 58 l equipped with a temperature-controlling device. After adjusting the temperature of the PTFE aqueous dispersion to 23° C., 545 g of carbon fiber (characteristic values: apparent density 0.63±0.03 g/ml, diameter 14.5±1.5 μm, length 170 μm) was added, and high pressure tap water was jetted as described hereinafter, to obtain a fine powdery PTFE composition.

Figure 2:
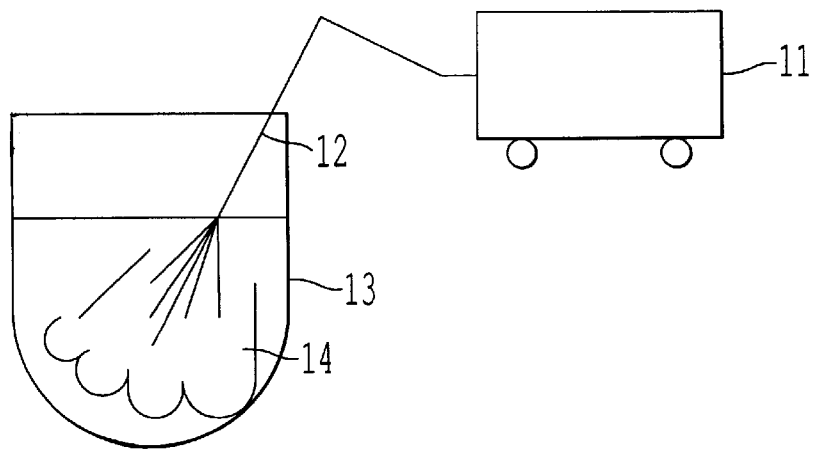
FIG. 2 is a schematic view illustrating the method of the present invention.
Figure 3:
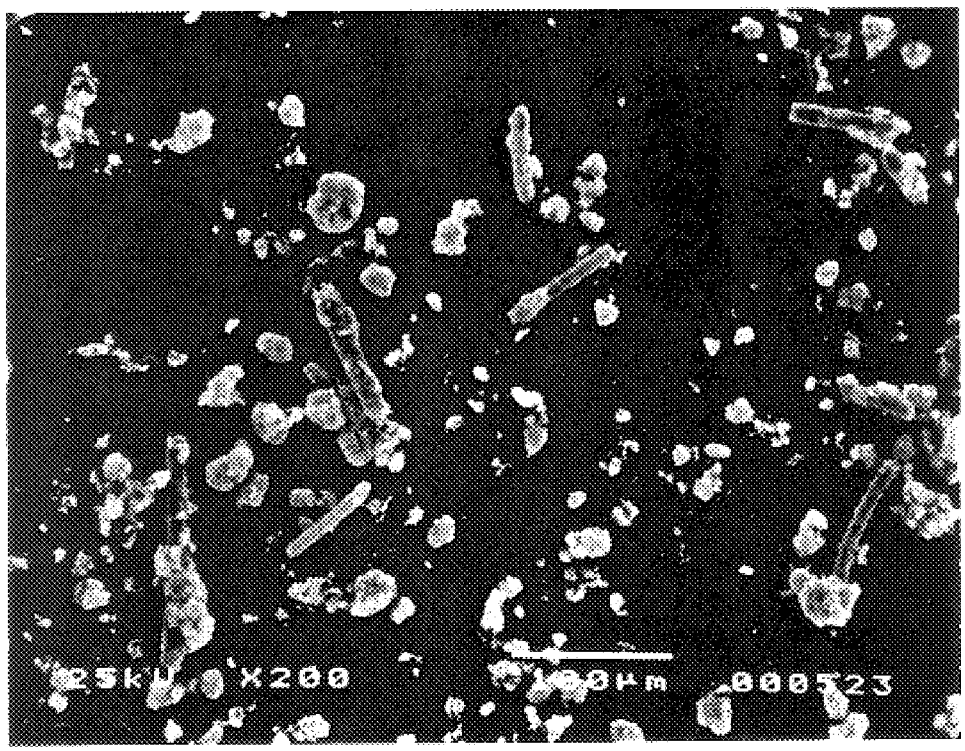
FIG. 3 is an electron microscopic photograph of the PTFE composition in Example 1 (200 magnifications).
Figure 4:
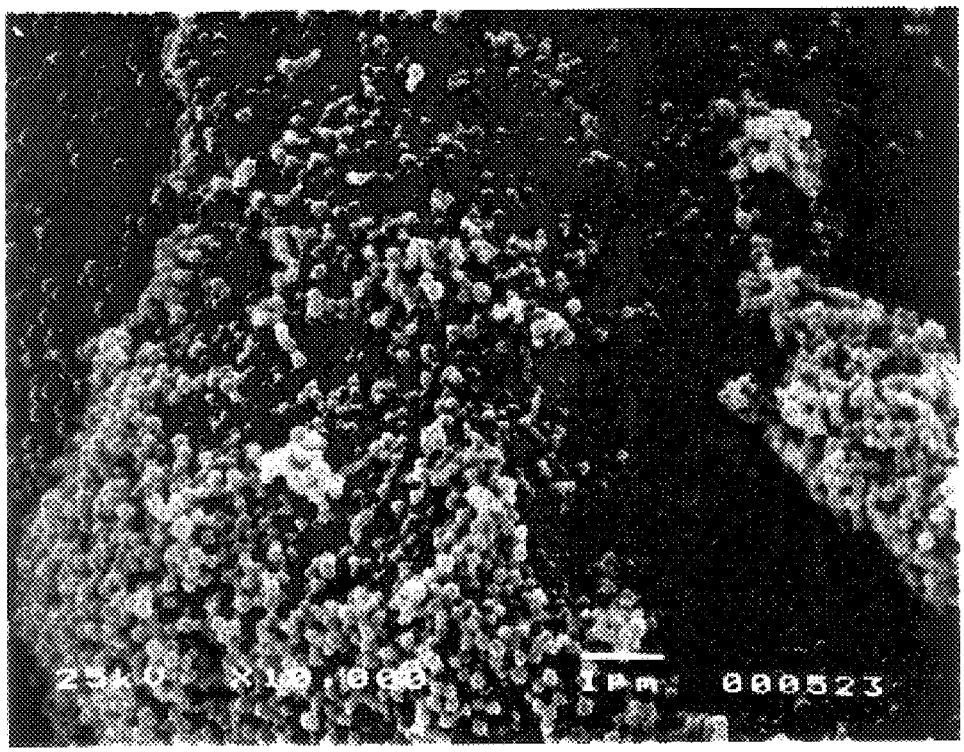
FIG. 4 is an electron microscopic photograph of the PTFE composition in Example 1 ($10^4$ magnifications).

A schematic view of the apparatus is shown in FIG. 2. Using a high pressure water generation apparatus 11 (Kyowa high pressure cleaning machine KYC-300H1) equipped with a diffusion nozzle 12, high pressure water was jetted to the PTFE aqueous dispersion 14 containing the carbon fiber in a treating tank 13 under jetting conditions of a jetting pressure of 7.85 MPa, a jetting distance of from 0 to 100 mm, a flow rate of 10 l/min and a jetting time of 2 minutes. The obtained fine powdery PTFE composition was subjected to filtration by a 200 mesh stainless steel net, then dehydrated and dried at 150° C. for 15 hours. The obtained PTFE composition had an average particle diameter of 26 μm, a powder irregular shape ratio of 25% and a PTFE coverage of 39%. A scanning electron microscopic photograph of the PTFE composition, as measured with 200 magnifications, is shown in FIG. 3. It was confirmed that the dispersed state of the filler and the PTFE was good. Further, it was found that the PTFE in the PTFE composition had a low powder irregular shape ratio and a high proportion of PTFE having a small aspect ratio. A scanning electron microscopic photograph of the carbon fiber in the PTFE composition, as measured with $10^4$ magnifications, is shown in FIG. 4. It was found that the PTFE bonded to the carbon fiber surface maintained the form of primary particles obtained by dispersion polymerization.

Figure 5:
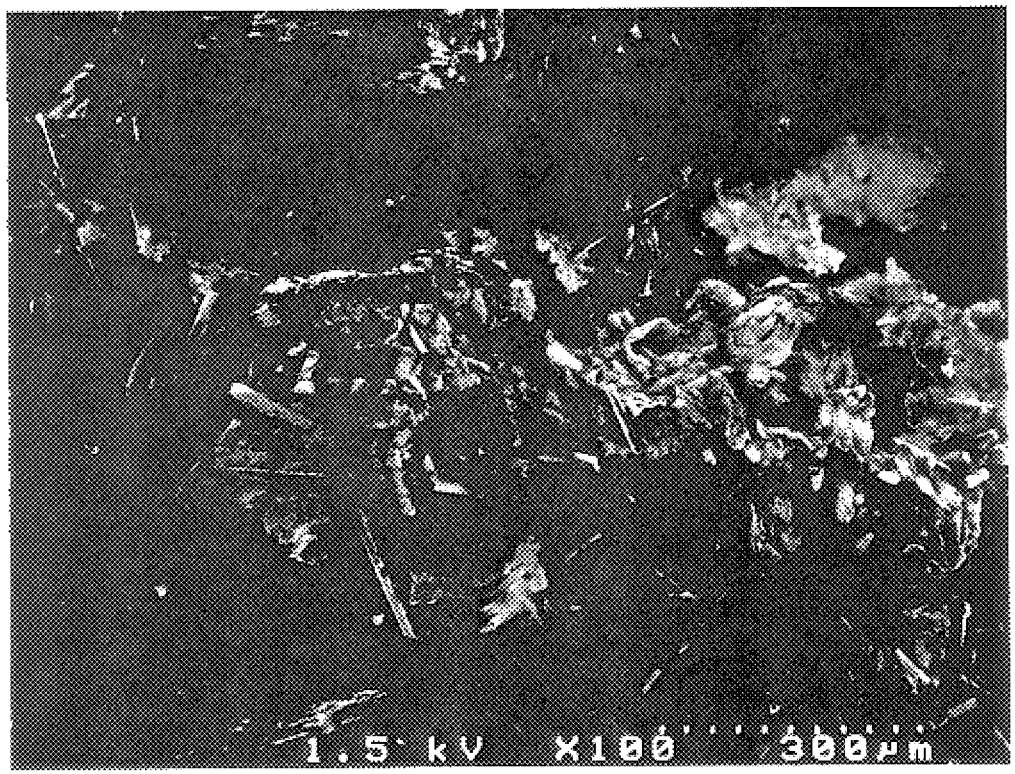
FIG. 5 is an electron microscopic photograph of the PTFE granulated product in Example 1 (100 magnifications).

(b) Preparation of PTFE granulated product 1,000 g of the PTFE composition was transferred to a 10 l container, and 630 ml of petroleum naphtha was added, followed by stirring. Then, the particle diameter was adjusted by a pan sizer for 15 minutes, followed by drying at 250° C. for 4 hours to obtain a PTFE granulated product. An electron microscopic photograph of the cross section of the PTFE granulated product is shown in FIG. 5. It was confirmed to be dense particles in which the carbon fiber and the PTFE were mutually dispersed. The granulated product had an average particle diameter of 601 μm, an apparent density of 0.70 g/ml, and a powder flowability of 10 mm.

The granulated product was molded into a sheet, and the properties were measured. The tensile strength was 18.1 MPa, the elongation was 285%, and the compressive creep was 2.9%.

EXAMPLES 2 AND 3

In the same manner as in Example 1, with the raw material compositions as identified in Table 2, PTFE compositions, granulated products and molded sheets were obtained. Their properties are shown in Table 2 together with Example 1. The property values of the graphite used were such that the average particle diameter was 25 μm, and the maximum particle diameter was 175 μm. Further, the property values of the glass fiber used were such that the apparent density ≦0.65 g/ml, the diameter was 10.5±1.0 μm, and the length was 25±10 μm.

EXAMPLE 4

(Comparative Example)

Figure 6:
FIG. 6 is an electron microscopic photograph of the PTFE granulated product in Example 4 (100 magnifications).

The same PTFE aqueous dispersion as in Example 1 was adjusted to a concentration of 10 mass %. 30 kg of this PTFE aqueous dispersion was charged into a stainless steel container having an internal volume of 58 l equipped with a temperature-controlling device. After adjusting the temperature of the PTFE aqueous dispersion to 23° C., 333 g of the same carbon fiber as in Example 1 was added, followed by stirring to coagulate the PTFE. Using the obtained PTFE composition, a granulated product was obtained in the same manner as in Example 1. The electron microscopic photograph of the cross section of the granulated product, as measured with 100 magnifications, is shown in FIG. 6. It was found that as compared with the granulated product of Example 1, the carbon fiber was contained non-uniformly, and it had pores in the interior. In the same manner as in Example 1, the properties of the granulated product and a sheet molded from the granulated product were measured. The results are shown in Table 2.

EXAMPLE 5

(Comparative Example)

Figure 7:
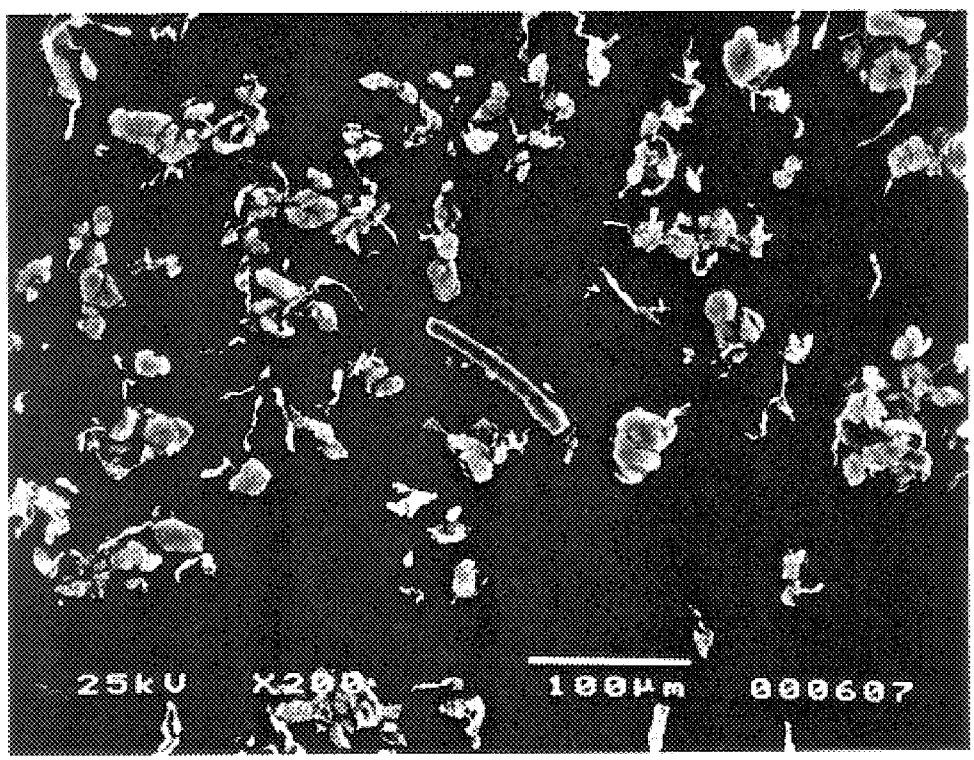
FIG. 7 is an electron microscopic photograph of the PTFE composition in Example 5 (200 magnifications).
Figure 8:
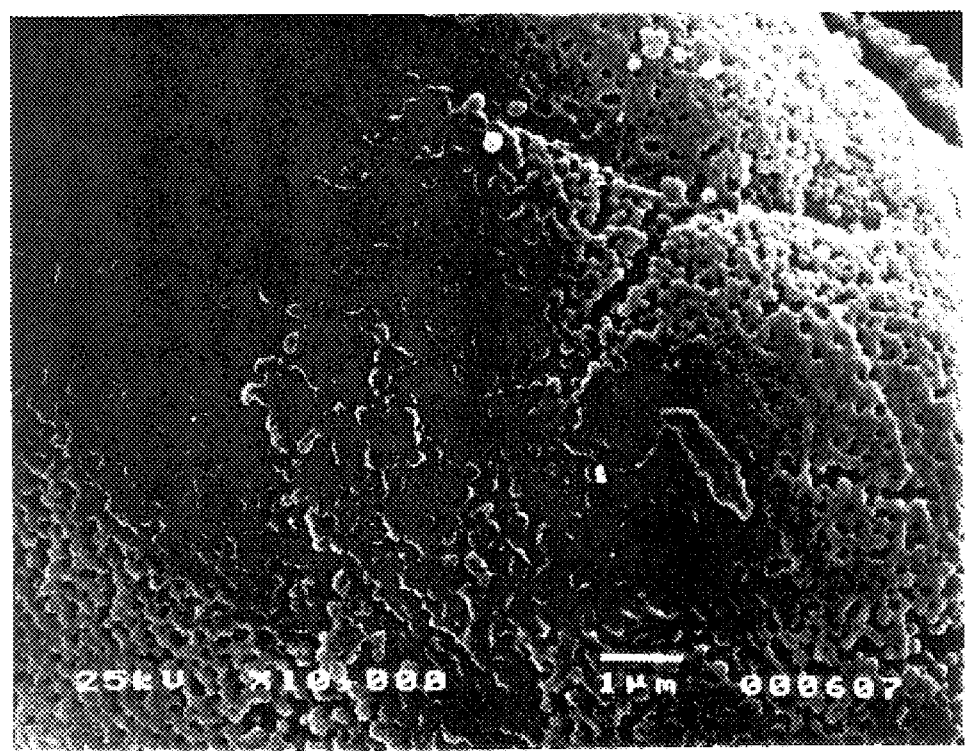
FIG. 8 is an electron microscopic photograph of the PTFE composition in Example 5 ($10^4$ magnifications).

A PTFE aqueous dispersion was stirred and coagulated in the same manner as in Example 4 except that no carbon fiber was added. The obtained coagulated product of PTFE was dried at 150° C. for 10 hours to obtain a PTFE fine powder. 900 g of the PTFE fine powder and 100 g of the same carbon fiber as in Example 1 were charged and stirring and mixing were carried out at a peripheral speed of 20 m/sec for 5 minutes to obtain a PTFE composition. A scanning electron microscopic photograph of the PTFE composition as measured with 200 magnifications, is shown in FIG. 7. It was found that the composition contained PTFE having a large aspect ratio. Further, a scanning electron microscopic photograph of the carbon fiber in the PTFE composition, as measured with $10^4$ magnifications, is shown in FIG. 8.

It was found that the PTFE bonded to the carbon fiber surface did not maintain the shape of the dispersion-polymerized primary particles. Further, the PTFE coverage was also low. Still further, the powder irregular shape ratio of the PTFE was large, which indicates that fibrillation proceeded.

Using the PTFE composition, a granulated product and a molded sheet were obtained in the same manner as in Example 1, and the property tests were carried out. The results are shown in Table 2.

TABLE 2

|  |  | Ex. 1 | Ex. 2 | Ex. 3 | Ex. 4 | Ex. 5 |
|---|---|---|---|---|---|---|
| Raw materials | PTFE powder (mass %) | 90 | 85 | 80 | 90 | 90 |
|  | Carbon fiber (mass %) | 10 | — | — | 10 | 10 |
|  | Graphite (mass %) | — | 15 | — | — | — |
|  | Glass fiber (mass %) | — | — | 20 | — | — |
| Composition | Average particle diameter (μm) | 26 | 28 | 27 | — | 28 |
|  | Powder irregular shape ratio (%) | 25 | 23 | 30 | — | 78 |
|  | PTFE coverage (%) | 39 | 41 | — | — | 26 |
| Granulated product | Average particle diameter (μm) | 601 | 692 | 689 | 540 | 640 |
|  | Apparent density (g/ml) | 0.70 | 0.68 | 0.87 | 0.51 | 0.58 |
|  | Powder flowability (mm) | 10 | 15 | 8 | 27 | 16 |
| Molded product | Tensile strength (MPa) | 18.1 | 14.2 | 21.7 | 19.5 | 17.6 |
|  | Elongation (%) | 285 | 186 | 334 | 280 | 255 |
|  | Compressive creep (%) | 2.9 | — | — | 3.1 | 3.3 |

The dispersion-polymerized PTFE composition and the granulated product of the present invention, have high apparent densities and good handling efficiency when they are subjected to molding, and present uniform molded products. Further, the yield of the molded products is improved. The molded products obtained by molding the dispersion-polymerized PTFE composition and the granulated product of the present invention, have excellent properties, such that the tendency to be charged is small, the surface is smooth, the elongation is large, and they are excellent in creep resistance.

The entire disclosure of Japanese Patent Application No. 2000-290978 filed on Sep. 25, 2000 including specification, claims, drawings and summary are incorporated herein by reference in its entirety.

What is claimed is:

1. A polytetrafluoroethylene composition comprising (1) a polytetrafluoroethylene component comprising a dispersion-polymerized polytetrafluoroethylene and (2) a filler, wherein the powder irregular shape ratio of the polytetrafluoroethylene composition is at most 50%.

2. The polytetrafluoroethylene composition according to claim 1, wherein polytetrafluoroethylene component consists essentially of the dispersion-polymerized polytetrafluoroethylene.

3. The polytetrafluoroethylene composition according to claim 1, wherein polytetrafluoroethylene component consists of the dispersion-polymerized polytetrafluoroethylene.

4. The polytetrafluoroethylene composition according to claim 1, wherein the coverage of the polytetrafluoroethylene by the filler is from 30 to 100%.

5. The polytetrafluoroethylene composition according to claim 1, wherein the mass ratio of the polytetrafluoroethylene/the filler is from 95/5 to 30/70.

6. The polytetrafluoroethylene composition according to claim 1, which has an average particle diameter of from 5 to 300 $\mu$m.

7. The polytetrafluoroethylene composition according to claim 1, wherein the filler is graphite, carbon fiber or glass fiber.

8. A method for producing the polytetrafluoroethylene composition as defined in claim 1, which comprises jetting high pressure water to a mixture comprising a dispersion-polymerized polytetrafluoroethylene and a filler to obtain a polytetrafluoroethylene composition having the polytetrafluoroethylene and the filler dispersed.

9. The method according to claim 8, wherein the pressure of the high pressure water is from 3 to 32 MPa.

10. The method according to claim 8, wherein the dispersion-polymerized polytetrafluoroethylene and the filler are mixed in a medium.

11. The method according to claim 10, wherein the medium is water.

12. The method according to claim 8, wherein an aqueous dispersion of the dispersion-polymerized polytetrafluoroethylene is used.

13. A polytetrafluoroethylene granulated product, obtained by granulating the polytetrafluoroethylene composition as defined in any one of claims 1 to 7.

14. The polytetrafluoroethylene granulated product according to claim 13, which has an average particle diameter of from 100 to 1,000 $\mu$m.

* * * * *